United States Patent
van Rietschote (10) Patent No.: US 7,533,229 B1
(45) Date of Patent: *May 12, 2009

(54) DISASTER RECOVERY AND BACKUP USING VIRTUAL MACHINES

(75) Inventor: Hans F. van Rietschote, Sunnyvale, CA (US)

(73) Assignee: Symantec Operating Corporation, Mountain View, CA (US)

( * ) Notice: Subject to any disclaimer, the term of this patent is extended or adjusted under 35 U.S.C. 154(b) by 418 days.

This patent is subject to a terminal disclaimer.

(21) Appl. No.: 11/451,001

(22) Filed: Jun. 12, 2006

Related U.S. Application Data (63) Continuation of application No. 10/109,186, filed on Mar. 28, 2002, now Pat. No. 7,093,086.

(51) Int. Cl.
*G06F 12/00* (2006.01)

(52) U.S. Cl. ...................................... 711/161

(58) Field of Classification Search ................... None
See application file for complete search history.

(56) References Cited

U.S. PATENT DOCUMENTS

| | | | |
|---|---|---|---|
| 4,912,628 A | 3/1990 | Briggs | |
| 4,969,092 A | 11/1990 | Shorter | |
| 5,257,386 A | 10/1993 | Saito | |
| 5,408,617 A | 4/1995 | Yoshida | |
| 5,546,558 A | 8/1996 | Jacobson et al. | |
| 5,621,912 A | 4/1997 | Borruso et al. | |
| 5,809,285 A | 9/1998 | Hilland | |
| 5,852,724 A | 12/1998 | Glenn, II et al. | |
| 5,872,931 A | 2/1999 | Chivaluri | |
| 5,944,782 A | 8/1999 | Noble et al. | |
| 5,987,565 A | 11/1999 | Gavaskar | |
| 6,003,065 A | 12/1999 | Yan et al. | |
| 6,029,166 A | 2/2000 | Mutalik et al. | |
| 6,075,938 A | 6/2000 | Bugnion et al. | |
| 6,151,618 A | 11/2000 | Wajbe et al. | |
| 6,230,246 B1 | 5/2001 | Lee et al. | |
| 6,298,390 B1 | 10/2001 | Matena et al. | |

(Continued)

OTHER PUBLICATIONS

Office Action from U.S. Appl. No. 10/108,882, mailed May 8, 2006.

(Continued)

*Primary Examiner*—Reginald G Bragdon
*Assistant Examiner*—Eric Loonan
(74) *Attorney, Agent, or Firm*—Lawrence J. Merkel; Meyertons, Hood, Kivlin, Kowert & Goetzel, P.C.

(57) ABSTRACT

One or more computer systems, a carrier medium, and a method are provided for backing up virtual machines. The backup may occur, e.g., to a backup medium or to a disaster recovery site, in various embodiments. In one embodiment, an apparatus includes a computer system configured to execute at least a first virtual machine, wherein the computer system is configured to: (i) capture a state of the first virtual machine, the state corresponding to a point in time in the execution of the first virtual machine; and (ii) copy at least a portion of the state to a destination separate from a storage device to which the first virtual machine is suspendable. A carrier medium may include instructions which, when executed, cause the above operation on the computer system. The method may comprise the above highlighted operations.

18 Claims, 8 Drawing Sheets

U.S. PATENT DOCUMENTS

| | | | |
|---|---|---|---|
| 6,298,428 | B1 | 10/2001 | Munroe et al. |
| 6,324,627 | B1 | 11/2001 | Kricheff et al. |
| 6,341,329 | B1 | 1/2002 | LeCrone et al. |
| 6,363,462 | B1 | 3/2002 | Bergsten |
| 6,370,646 | B1 | 4/2002 | Goodman et al. |
| 6,397,242 | B1 | 5/2002 | Devine et al. |
| 6,421,739 | B1 | 7/2002 | Holiday |
| 6,438,642 | B1 | 8/2002 | Shaath |
| 6,493,811 | B1 | 12/2002 | Blades et al. |
| 6,496,847 | B1 | 12/2002 | Bugnion et al. |
| 6,542,909 | B1 | 4/2003 | Tamer et al. |
| 6,694,346 | B1 | 2/2004 | Aman et al. |
| 6,704,925 | B1 | 3/2004 | Bugnion |
| 6,711,672 | B1 | 3/2004 | Agesen |
| 6,718,538 | B1 | 4/2004 | Mathiske |
| 6,725,289 | B1 | 4/2004 | Waldspurger et al. |
| 6,735,601 | B1 | 5/2004 | Subrahmanyam |
| 6,757,778 | B1 | 6/2004 | van Rietschote |
| 6,763,440 | B1 | 7/2004 | Traversat et al. |
| 6,763,445 | B1 | 7/2004 | Klein et al. |
| 6,772,231 | B2 | 8/2004 | Reuter et al. |
| 6,785,886 | B1 | 8/2004 | Lim et al. |
| 6,789,103 | B1 | 9/2004 | Kim et al. |
| 6,789,156 | B1 | 9/2004 | Waldspurger |
| 6,795,966 | B1 | 9/2004 | Lim et al. |
| 6,802,062 | B1 | 10/2004 | Oyamada et al. |
| 6,961,806 | B1 | 11/2005 | Agesen et al. |
| 6,961,941 | B1 | 11/2005 | Nelson et al. |
| 6,985,956 | B2 | 1/2006 | Luke et al. |
| 7,069,413 | B1 | 6/2006 | Agesen et al. |
| 7,082,598 | B1 | 7/2006 | Le et al. |
| 7,089,377 | B1 | 8/2006 | Chen |
| 7,093,086 | B1 | 8/2006 | van Rietschote |
| 7,111,086 | B1 | 9/2006 | Ecoleston et al. |
| 7,111,145 | B1 | 9/2006 | Chen et al. |
| 7,111,481 | B2 | 9/2006 | Green et al. |
| 7,203,944 | B1 | 4/2007 | van Rietschote et al. |
| 7,213,246 | B1 | 5/2007 | van Rietchote et al. |
| 7,246,200 | B1 | 7/2007 | van Rietschote et al. |
| 2001/0016879 | A1 | 8/2001 | Sekiguchi et al. |
| 2002/0049869 | A1 | 4/2002 | Ohmura et al. |
| 2002/0069369 | A1 | 6/2002 | Tremain |
| 2002/0099753 | A1 | 7/2002 | Hardin et al. |
| 2002/0129078 | A1 | 9/2002 | Plaxton et al. |
| 2003/0028861 | A1 | 2/2003 | Wallman et al. |
| 2003/0033431 | A1 | 2/2003 | Shinomiya |
| 2003/0110351 | A1 | 6/2003 | Blood et al. |
| 2004/0010787 | A1 | 1/2004 | Traut et al. |

OTHER PUBLICATIONS

Veritas, "Executive Overview," Technical Overview, pp. 1-9.
Kinshuk Govil, et al., "Cellular Disco: Resource Management Using Virtual Clusters on Shared-Memory Multiprocessors," 17th ACM Symposium on Operating Systems Principles (SOSP'99), Published as Operating Systems Review 34(5):154-169, Dec. 1999, pp. 154-169.
Edouard Bugnion, et al., "Disco: Running Commodity Operating Systems on Scalable Multiprocessors," Computer Systems Laboratory, Stanford, CA, 33 pages.
"White Paper, GSX Server," VMware, Inc., Dec. 2000, pp. 1-9.
"Vmware GSX Serve, The Server Consolidation Solution," VMware, Inc., 2001, 2 pages.
"Manage Multiple Worlds., From Any Desktop," VMware, Inc., 2000, 2 pages.
"VMware ESX Server, The Server Consolidation Solution for High-Performance Environments," VMware, Inc., 2001, 2 pages.
Melinda Varian, "VM and the VM Community: Past, Present, and Future," Operating Systems, Computing and Information Technology, Princeton Univ., Aug. 1997, pp. 1-67.
Veritas, "Comparison: Microsoft Logical Disk Manager and Veritas Volume Manager for Windows," May 2001, 4 pages.
Veritas, "How Veritas Volume Manager Complements Hardware RAID in Microsoft Server Environments," May 2001, pp. 1-7.
Veritas, "Veritas Volume Manager for Windows, Best Practices," May 2001, pp. 1-7.
Barrie Sosinky, Ph.D., "The Business Value of Virtual Volume Management, In Microsoft Windows NT and Windows 2000 Netowrks," Veritas, A white paper for administrators and planners, Oct. 2001, pp. 1-12.
"BladeFram™ System Overview," Egenera, Inc., 2001 2 pages.
White Paper, "The Egenera™ Processing Area Network (PAN) Architecture," Egenera, Inc., 2002, 20 pages.
White Paper, "Emerging Server Architectures," Egenera, Inc., 2001, 12 pages.
White Paper, "Improving Data Center Performance," Egenera, Inc., 2001, 19 pages.
White Paper, "Guidelines for Effective E-Business Infrastructure Management," Egenera, Inc., 2001, 11 pages.
White Paper, "The Pros and Cons of Server Clustering in the ASP Environment," Egenera, Inc., 2001, 10 pages.
Position Paper, "Taking Control of The Data Center," Egenera, Inc., 2001, 4 pages.
Position Paper, "The Linux Operating System: How Open Source Software Makes Better Hardware," Egenera, Inc., 2001, 2 pages.
"Solution Overview," TrueSAN Networks, Inc., 2002, 7 pages.
"Simics: A Full System Simulation Platform," Reprinted with permission from Computer, Feb. 2002, © The Institute of Electrical and Electronics Engineering, Inc., pp. 50-58.
"Introduction to Simics Full-System Simulator without Equal," Virtutech, Jul. 8, 2002, 29 pages.
"The Technology of Virtual Machines," A Conneectix White Paper, Connectix Corp., 2001, 13 pages.
"The Technology of Virtual PC," A Conneectix White Paper, Connectix Corp., 2000, 12 pages.
"About LindowsOS," Lindows.com, http://www.lindows.com/lindows_products_lindows.php, 2002, 2 pages.
"Savannah: This is a Savannah Admin Documentation," Savannah, Free Software Foundation, Inc.© 2000-2002, 31 pages.
"Virtuozzo Basics," Virtuozzo, http://www.sw-soft.com/en/products/virtuozzo/basics/, © 1994-2002 SWsoft, printed from web on Dec. 13, 2002, 2 pages.
"What is Virtual Environment(VE)?," SWsoft, http://www.sw-soft/en/products/virtuozzo/we/, © 1994-2002 SWsoft, printed from web on Dec. 13, 2002, 2 pages.
John R. Sheets, et al. "Wine User Guide," www.winehq.org, pp. 1-53.
"Products," Netraverse, Inc, 2002, http://www.netraverse.com/products/index.php, printed from web on Dec. 13, 2002, 1 page.
"NeTraverse Win4Lin 4.0—Workstation Edition," Netraverse, Inc, 2002, http://www.netraverse.com/products/win4lin40/, printed from web on Dec. 13, 2002, 1 page.
"Win4Lin Desktop 4.0," Netraverse, Inc, 2002, http://www.netraverse.com/products/win4lin40/benefits.php, printed from web on Dec. 13, 2002, 1 page.
"Win4Lin Desktop 4.0," Netraverse, Inc, 2002, http://www.netraverse.com/products/win4lin40/features.php, printed from web on Dec. 13, 2002, 2 page.
"Win4Lin Desktop 4.0," Netraverse, Inc, 2002, http://www.netraverse.com/products/win4lin40/requirements.php, printed from web on Dec. 13, 2002, 2 page.
"Win4Lin Terminal Server 2.0," Netraverse, Inc, 2002, http://www.netraverse.com/ products/wts, printed from web on Dec. 13, 2002, 1 page.
"Win4Lin Terminal Server 2.0," Netraverse, Inc, 2002, http://www.netraverse.com/ products/wts/benefits.php, printed from web on Dec. 13, 2002, 1 page.
Win4Lin Terminal Server 2.0, Netraverse, Inc, 2002, http://www.netraverse.com/products/wts/features.php, printed from web on Dec. 13, 2002, 2 pages.
Win4Lin Terminal Server 2.0, Netraverse, Inc, 2002, http://www.netraverse.com/products/wts/requirements.php, printed from web on Dec. 13, 2002, 2 pages.

Win4Lin Terminal Server 2.0, Netraverse, Inc, 2002, http://www.netraverse.com/products/wts/technology.php, printed from web on Dec. 13, 2002, 1 page.

Win4Lin, Netraverse, Inc, 2002, http://www.netraverse.com/support/docs/Win4Lin-whitepapers.php, printed from web on Dec. 13, 2002, 5 pages.

"Virtual PC for Windows," Connectix, Version 5.0, 2002, 2 pages.

Dave Gardner, et al., "Wine FAQ," © David Gardner 1995-1998, printed from www.winehq.org, 13 pages.

"Winelib User's Guide," Winelib, www.winehq.org, 26 pages.

"Wine Developer's Guide," pages, www.winehq.org, 1-104.

Veritas, "Veritas Volume Manager for Windows NT," Version 27, 2001, 4 pages.

VMware, Inc., "VMware Control Center," 2003, 3 pages.

InfoWorld, Robert McMillan, "VMware Launches VMware Control Center," 2003, 2 pages.

VMware, Inc., "VMware Control Center: Enterprise-class Software to Manage and Control Your Virtual Machines," 2003, 2 pages.

John Abbott, Enterprise Software, "VMware Heads Toward Utility Computing With New Dynamic Management Tools," Jul. 1, 2003, 4 pages.

Dejan S. Milogicic, et al., "Process Migration," Aug. 10, 1999, 49 pages.

Xian-He Sun, et al., "A Coordinated Approach for Process Migration in Heterogeneous Environments," 1999, 12 pages.

Kasidit Chanchio, et al., "Data Collection and Restoration for Heterogeneous Process Migration," 1997, 6 pages.

Kasidit Chanchio, et al., "A Protocol Design of Communication State Transfer for Distributed Computing," Publication date unknown, 4 pages.

SourceForge™, "Project: openMosix: Document Manager: Display Document," 14 pages.

OpenMosix, "The openMosix HOWTO: Live free() or die ()," May 7, 2003, 3 pages.

OpenMosix, "openMosix Documentation Wiki—don't," May 7, 2003, 2 pages.

Sapuntzakis, et al., "Optimizing the Migration of Virtual Computers," Proceedings of the Fifth Symposium on Operating Systems Design and Implementation, Dec. 2002, 14 pages.

Helfrich, et al., "Internet Suspend/Resume," ISR Project Home Page, 2003, 4 pages.

Kozuch, et al., "Efficient State Transfer for Internet Suspend/Resume," IRP-TR-02-03, May 2002, Intel Research, 13 pages.

Kozuch, et al., "Internet Suspend/Resume," IRP-TR-02-01, Apr. 2002, Accepted to the Fourth IEEE Workshop on Mobile Computing Systems and Applications, Callicoon, NY, Jun. 2002, Intel Research, 9 pages.

Tolia, et al., "Using Content Addressing to Transfer Virtual Machine State," IRP-TR-02-11, Summer 2002, Intel Research, 11 pages.

Flinn, et al., "Data Staging on Untrusted Surrogates," IRP-TR-03-03, Mar. 2003, Intel Research, To Appear in the Proceedings of the $2^{nd}$ USENIX Conference on File and Storage Technologies, San Francisco, 16 pages.

Tolia, et al., "Opportunistic Use of Content Addressable Storage for Distributed File Systems," IRP-TR-03-02, Jun., 2003, Intel Research, To Appear in the Proceedings of the 2003 USENIX Annual Technical Conference, San Antonio, TX, 16 pages.

The Office Action mailed on Sep. 30, 2004 for U.S. Appl. No. 10/109,406.

"U.S. Patent and Trademark Office, "Office Communication" for U.S. Appl. No. 10/109,406 mailed Feb. 9, 2005 (14 pages)."

"U.S. Patent and Trademark Office, "Office Communication" for U.S. Appl. No. 10/108,882 mailed Jun. 24, 2005 (11 pages)."

Office Action from U.S. Appl. No. 10/108,882, mailed Dec. 23, 2005.

DISASTER RECOVERY AND BACKUP USING VIRTUAL MACHINES

This application is a continuation of U.S. patent application Ser. No. 10/109,186 filed Mar. 28, 2002 and now U.S. Pat. No. 7,093,086 issued on Aug. 15, 2006.

BACKGROUND OF THE INVENTION

1. Field of the Invention

This invention is related to the field of computer systems and, more particularly, to backup and disaster recovery mechanisms in computer systems.

2. Description of the Related Art

Computer systems, and their components, are subject to various failures which may result in the loss of data. For example, a storage device used in or by the computer system may experience a failure (e.g. mechanical, electrical, magnetic, etc.) which may make any data stored on that storage device unreadable. Erroneous software or hardware operation may corrupt the data stored on a storage device, destroying the data stored on an otherwise properly functioning storage device. Any component in the storage chain between (and including) the storage device and the computer system may experience failure (e.g. the storage device, connectors (e.g. cables) between the storage device and other circuitry, the network between the storage device and the accessing computer system (in some cases), etc.).

To mitigate the risk of losing data, computer system users typically make backup copies of data stored on various storage devices. Typically, backup software is installed on a computer system and the backup may be scheduled to occur periodically and automatically. In many cases, an application or applications may be in use when the backup is to occur. The application may have one or more files open, preventing access by the backup software to such files.

Some backup software may include custom code for each application (referred to as a "backup agent"). The backup agent may attempt to communicate with the application or otherwise cause the application to commit its data to files so that the files can be backed up. Often, such backup agents make use of various undocumented features of the applications to successfully backup files. As the corresponding applications change (e.g. new versions are released), the backup agents may also require change. Additionally, some files (such as the Windows registry) are always open and thus difficult to backup.

Disaster recovery configurations are used in some cases to provide additional protection against loss of data due to failures, not only in the computer systems themselves but in the surrounding environment (e.g. loss of electrical power, acts of nature, fire, etc.). In disaster recovery configurations, the state of data may periodically be checkpointed from a first computer system to a second computer system. In some cases, the second computer system may be physically located distant from the first computer system. If a problem occurs that causes the first computer system to go down, the data is safely stored on the second computer system. In some cases, applications previously running on the first computer system may be restarted on the second computer system to allow continued access to the preserved data. The disaster recovery software may experience similar issues as the backup software with regard to applications which are running when a checkpoint is attempted and the files that the applications may have open at the time of the checkpoint. Additionally, replicating all the state needed to restart the application on the second computer system (e.g. the operating system and its configuration settings, the application and its configuration settings, etc.) is complicated.

SUMMARY OF THE INVENTION

One or more computer systems, a carrier medium, and a method are provided for backing up virtual machines. The backup may occur, e.g., to a backup medium or to a disaster recovery site, in various embodiments. In one embodiment, an apparatus includes a computer system configured to execute at least a first virtual machine, wherein the computer system is configured to: (i) capture a state of the first virtual machine, the state corresponding to a point in time in the execution of the first virtual machine; and (ii) copy at least a portion of the state to a destination separate from a storage device to which the first virtual machine is suspendable. A carrier medium may include instructions which, when executed, cause the above operation on the computer system. The method may comprise the above highlighted operations.

BRIEF DESCRIPTION OF THE DRAWINGS

The following detailed description makes reference to the accompanying drawings, which are now briefly described.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

A computer system executes one or more virtual machines, each of which may include one or more applications. To create a backup, the computer system may capture a state of each virtual machine and backup the state. In one embodiment, the computer system may capture the state in cooperation with a virtual machine kernel which controls execution of the virtual machines, while the virtual machines continue to execute. The state may include the information in a virtual machine image created in response to a suspension of the virtual machine. In another embodiment, the computer system may capture the state by suspending each virtual machine to an image and backing up the image of the virtual machine. In this manner, the files used by the application are backed up, even if the application has the files open while the virtual machine is active in the computer system. Furthermore, updates to the files which are not yet committed (e.g. they are still in memory in the virtual machine) may be backed up as well. In some cases, only a portion of the state or image need be backed-up at a given time (e.g. non-persistent virtual disks may be backed-up by copying the COW files corresponding to those disks, if an initial copy of the disk file has been made).

Similarly, for disaster recovery configurations, the computer system may periodically capture the state of the virtual machines as a checkpoint. The checkpoints may be copied to a second computer system, which may retain one or more checkpoints for each virtual machine. In the event of a "disaster" at the original computer system, the virtual machines may be resumed from one of the checkpoints on the second computer system. The loss of data may be limited to the data created between the selected checkpoint and the point at which the disaster occurred. The checkpoints may be created by capturing state while the virtual machines continue to execute, or by suspending the virtual machines and copying the suspended image. As mentioned above, in some cases, only a portion of the state or image may be copied. Since the virtual machine state includes all of the state used by the application (operating system and its configuration settings, the application and its configuration settings, etc.), restarting the application on the second computer system may occur correctly.

Figure 1:
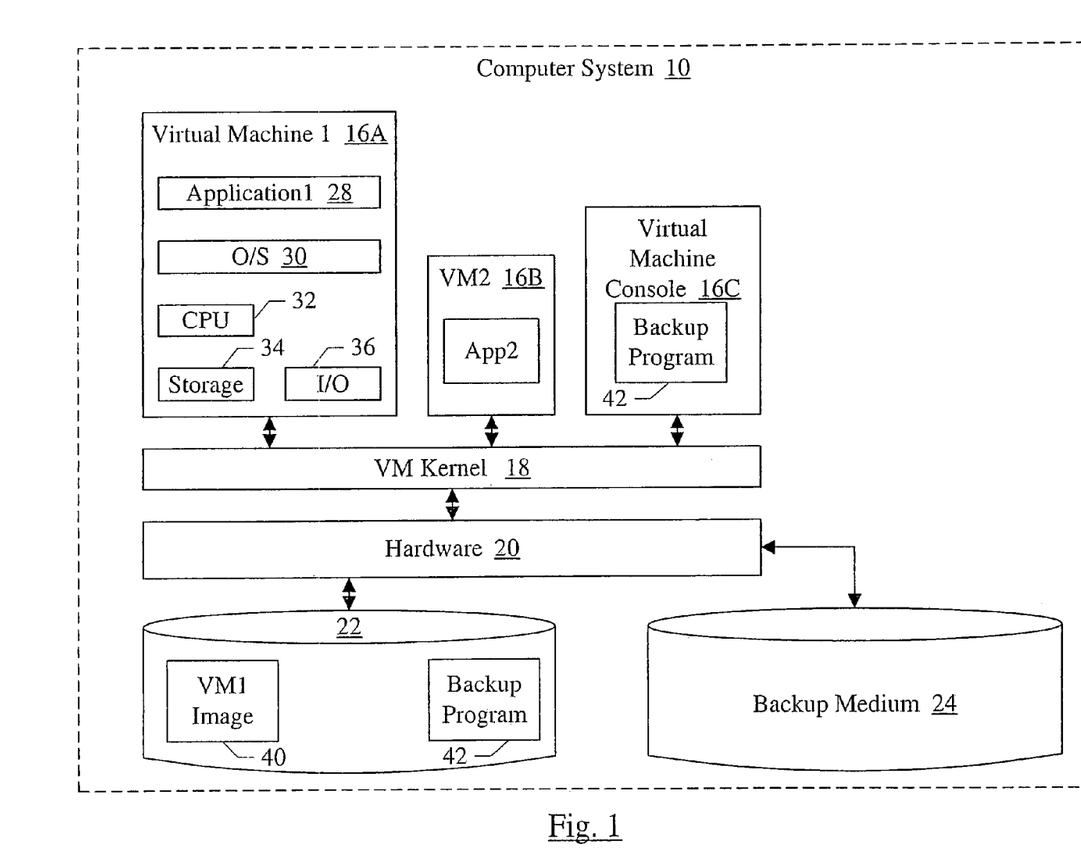
FIG. 1 is a block diagram of one embodiment of a computer system.

Turning now to FIG. 1, a block diagram is shown illustrating one embodiment of a computer system 10 for performing a backup. Other embodiments are possible and contemplated. The computer system 10 includes one or more virtual machines (e.g. virtual machines 16A-16C as illustrated in FIG. 1). The virtual machines are controlled by a virtual machine (VM) kernel 18. The virtual machines 16A-16C and the VM kernel 18 may comprise software and/or data structures. The software may be executed on the underlying hardware in the computer system 10 (e.g. the hardware 20). The hardware may include any desired circuitry. For example, the hardware may include one or more processors, or central processing units (CPUs), storage, and input/output (I/O) circuitry. In the embodiment of FIG. 1, the computer system 10 includes a storage device 22 and a backup medium 24.

As shown in FIG. 1, each application executing on the computer system 10 executes within a virtual machine 16A-16C. Generally, a virtual machine comprises any combination of software, one or more data structures in memory, and/or one or more files stored on a storage device (such as the storage device 22). The virtual machine mimics the hardware used during execution of a given application. For example, in the virtual machine 16A, an application 28 is shown. The application 28 is designed to execute within the operating system (O/S) 30. Both the application 28 and the O/S 30 are coded with instructions executed by the virtual CPU 32. Additionally, the application 28 and/or the O/S 30 may make use of various virtual storage devices 34 and virtual I/O devices 36. The virtual storage may include any type of storage, such as memory, disk storage, tape storage, etc. The disk storage may be any type of disk (e.g. fixed disk, removable disk, compact disc read-only memory (CD-ROM), rewriteable or read/write CD, digital versatile disk (DVD) ROM, etc.). Each disk storage in the virtual machine may be mapped to a file on a storage device such as the storage device 22A. Alternatively, each disk storage may be mapped directly to a storage device, or a combination of direct mappings and file mappings may be used. The virtual I/O devices may include any type of I/O devices, including modems, audio devices, video devices, network interface cards (NICs), universal serial bus (USB) ports, firewire (IEEE 1394) ports, serial ports, parallel ports, etc. Generally, each virtual I/O device may be mapped to a corresponding I/O device in the underlying hardware or may be emulated in software if no corresponding I/O device is included in the underlying hardware.

The virtual machine in which an application is executing encompasses the entire system state associated with an application. Generally, when a virtual machine is active (i.e. the application within the virtual machine is executing), the virtual machine may be stored in the memory of the computer system on which the virtual machine is executing (although the VM kernel may support a paging system in which various pages of the memory storing the virtual machine may be paged out to local storage in the computer system) and in the files which are mapped to the virtual storage devices in the virtual machine. The VM kernel may support a command to suspend the virtual machine. In response to the command, the VM kernel may write an image of the virtual machine to the storage device 22 (e.g. the image 40 shown in FIG. 1), thus capturing the current state of the virtual machine and thus implicitly capturing the current state of the executing application. The image may include one or more files written in response to the suspend command, capturing the state of the virtual machine that was in memory in the computer system, as well as the files representing the virtual storage in the virtual machine. The state may include not only files written by the application, but uncommitted changes to files which may still be in the memory within the virtual machine, the state of the hardware (including the processor 32, the memory in the virtual machine, etc.) within the virtual machine, etc. Thus, the image may be a snapshot of the state of the executing application.

A suspended virtual machine may be resumed using a resume command supported by the VM kernel. In response to the resume command, the VM kernel may read the image of the suspended virtual machine from the storage device and may activate the virtual machine in the computer system.

The computer system 10 may be configured to backup the virtual machines executing thereon. For example, in the illustrated embodiment, a backup program 42 may execute in the virtual machine 16C (and may also be stored on the storage device 22). The virtual machine 16C may be a console virtual machine as illustrated in FIG. 1 (a virtual machine which also has direct access to the hardware 20 in the computer system 10). Alternatively, the backup program 42 may execute on a non-console virtual machine or outside of a virtual machine.

The backup program 42 may suspend the virtual machines executing on the computer system 10 (e.g. the virtual machines 16A-16B as shown in FIG. 1) and backup the image of each virtual machine (e.g. the image 40 of the virtual machine 16A) onto the backup medium 24 (or send the image files to a backup server, if the backup server is serving as the backup medium 24). Once the backup has been made, the backup program 42 may resume the virtual machines to allow their execution to continue.

Since a given virtual machine is suspended during the backup operation for that virtual machine, the files used by the application(s) within the virtual machine may be backed up even if the files are in use by the application(s) at the time the virtual machine is suspended. Each virtual machine may be suspended and backed up in the same fashion. Thus, the backup program 42 may not include any specialized backup agents for different applications that may be included in the various virtual machines.

In the embodiment of FIG. 1, the backup medium 24 may be used to store the images of the virtual machine. Generally, the backup medium 24 may be any medium capable of storing data. For example, the backup medium 24 may be storage device similar to the storage device 22. The backup medium 24 may be a removable storage device, to allow the backup medium to be separated from the computer system 10 after the backup is complete. Storing the backup medium physically separated from the computer system that is backed up thereon may increase the reliability of the backup, since an event which causes problems on the computer system may not affect the backup medium. For example, the backup medium 24 may comprise a removable disk or disk drive, a tape backup, writeable compact disk storage, etc. Alternatively, the backup medium 24 may comprise another computer system (e.g. a backup server) coupled to receive the backup data from the computer system 10 (e.g. via a network coupling the two computer systems), a storage device attached to a network to which the computer system is attached (e.g. NAS or SAN technologies), etc.

The virtual hardware in the virtual machine 16A (and other virtual machines such as the virtual machines 16B-16C) may be similar to the hardware 20 included in the computer system 10. For example, the virtual CPU 32 may implement the same instruction set architecture as the processor(s) in the hardware 20. In such cases, the virtual CPU 32 may be one or more data structures storing the processor state for the virtual machine 16A. The application and O/S software instructions may execute on the CPU(s) in the hardware 20 when the virtual machine 16A is scheduled for execution by the VM kernel 18. When the VM kernel 18 schedules another virtual machine for execution (e.g. the virtual machine 16B), the VM kernel 18 may write the state of the processor into the virtual CPU 32 data structure. Alternatively, the virtual CPU 32 may be different from the CPU(s) in the hardware 20. For example, the virtual CPU 32 may comprise software coded using instructions from the instruction set supported by the underlying CPU to emulate instruction execution according to the instruction set architecture of the virtual CPU 32. Alternatively, the VM kernel 18 may emulate the operation of the hardware in the virtual machine. Similarly, any virtual hardware in a virtual machine may be emulated in software if there is no matching hardware in the hardware 20.

Different virtual machines which execute on the same computer system 10 may differ. For example, the O/S 30 included in each virtual machine may differ. Different virtual machines may employ different versions of the same O/S (e.g. Microsoft Windows NT with different service packs installed), different versions of the same O/S family (e.g. Microsoft Windows NT and Microsoft Windows2000), or different O/Ss (e.g. Microsoft Windows NT, Linux, Sun Solaris, etc.).

Generally, the VM kernel may be responsible for managing the virtual machines on a given computer system. The VM kernel may schedule virtual machines for execution on the underlying hardware, using any scheduling scheme. For example, a time division multiplexed scheme may be used to assign time slots to each virtual machine. Additionally, the VM kernel may handle the suspending and resuming of virtual machines responsive to suspend and resume commands. The commands may be received from a virtual machine, or may be communicated from another computer system. In one embodiment, the VM kernel may be the ESX product available from VMWare, Inc. (Palo Alto, Calif.).

In the illustrated embodiment, the VM kernel may execute directly on the underlying hardware (i.e. without an underlying operating system). In other embodiments, the VM kernel may be designed to execute within an operating system. For example, the GSX product available from VMWare, Inc. may execute under various versions of Microsoft's Windows operating system and/or the Linux operating system.

The storage device 22 may be any type of storage device to which the computer systems 10 may be coupled. For example, the storage device 22 may comprise one or more fixed disk drives such as integrated drive electronics (IDE) drives, small computer system interface (SCSI) drives, etc. The fixed disk drives may be incorporated as peripherals of the computer systems 10 through a peripheral bus in the computer systems 10 such as the peripheral component interconnect (PCI) bus, USB, firewire, etc. Alternatively, the storage device 22 may couple to a network (e.g. network attached storage (NAS) or storage area network (SAN) technologies may be used). The storage device 22 may be included in file servers to which the computer systems 10 have access. The storage device 22 may also be removable disk drives, memory, etc. Generally, a storage device is any device which is capable of storing data.

It is noted that, while each virtual machine illustrated in FIG. 1 includes one application, generally a virtual machine may include one or more applications. For example, in one embodiment a user may execute all applications which execute on the same underlying O/S 30 in the same virtual machine.

It is noted that the term "program", as used herein, refers to a set of instructions which, when executed, perform the function described for that program. The instructions may be machine level instructions executed by a CPU, or may be higher level instructions defined in a given higher level language (e.g. shell scripts, interpretive languages, etc.). The term "software" may be synonymous with "program".

Figure 2:
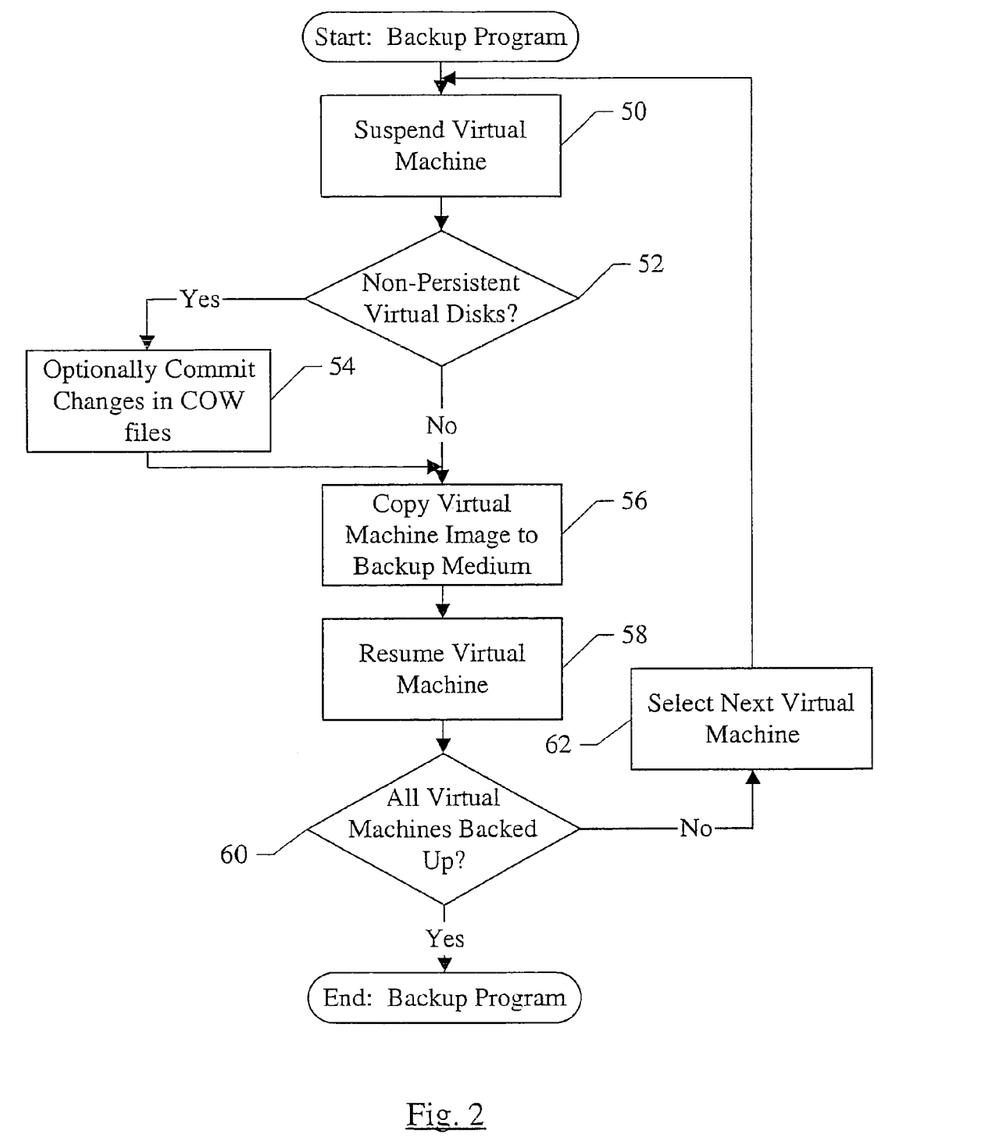
FIG. 2 is a flowchart illustrating operation of one embodiment of a backup program shown in FIG. 1.

Turning next to FIG. 2, a flowchart is shown illustrating operation of one embodiment of the backup program 42. Other embodiments are possible and contemplated. The blocks shown in FIG. 2 may represent the operation of instructions forming the backup program 42, when executed.

The backup program 42 suspends a virtual machine (block 50). As mentioned above, the VM kernel supports a suspend command. The backup program 42 transmits the send command to the VM kernel to suspend the virtual machine. The command may include a virtual machine "name" assigned by the VM kernel or the user which uniquely identifies the virtual machine to the VM kernel.

The virtual machines may have one or more virtual disks which are defined to be "non-persistent". Generally, a non-persistent virtual disk is one in which writes to the virtual disk are not committed until a separate "commit" command is executed for the virtual disk. By way of contrast, writes to a "persistent" virtual disk are committed at the time of the individual writes. In one embodiment, the non-persistent disks may be implemented as two files: a virtual disk file and a copy-on-write (COW) file for each disk. In embodiments using the ESX/GSX products from VMWare, Inc., the COW file may be the file with the extension ".REDO". The virtual disk file may be a file the size of the virtual disk. The virtual disk file may be organized as a set of disk blocks, in a fashion similar to physical disk drives. The COW file stores updated copies of disk blocks in a log form. Thus, the virtual disk file may contain the disk blocks prior to any uncommitted updates being made. If more than one write has been made to a given block, the COW file may store multiple copies of the block, one for each write that has occurred. To commit the writes, the blocks from the COW file may be written to the corresponding block locations in the virtual disk file, beginning at the start of the COW file and proceeding, in order, to the end. Both the virtual disk files and the corresponding COW files may be included in the virtual machine image 40.

If the suspended virtual machine includes one or more non-persistent virtual disks (decision block 52), the backup program 42 may commit the changes in the COW files to the corresponding virtual disks prior to making the backup (block 54). Alternatively, the backup program 42 may backup the virtual disk and COW files. In such an embodiment, the backup program 42 may optionally commit the changes after copying the virtual machine image to the backup medium, if desired. In yet another alternative, only the COW files may be copied for non-persistent virtual disks after an initial copy of the virtual disk file is made.

The backup program 42 copies the virtual machine image 40 to the backup medium 24 (block 56) and resumes the virtual machine on the computer system 10 (block 58). If additional virtual machines remain to be backed-up (decision block 60), the backup program 42 selects the next virtual machine (block 62) and repeats blocks 50-60 for that virtual machine.

While the flowchart shown in FIG. 2 illustrates backing up one virtual machine at a time, other embodiments may suspend all the virtual machines, copy the images to the backup medium 24, and resume all the virtual machines.

It is noted that, while the present embodiment may include non-persistent virtual disks with COW files, other embodiments may have only persistent virtual disks and the disks files may be backed up as a whole each time a backup occurs.

Figure 3:
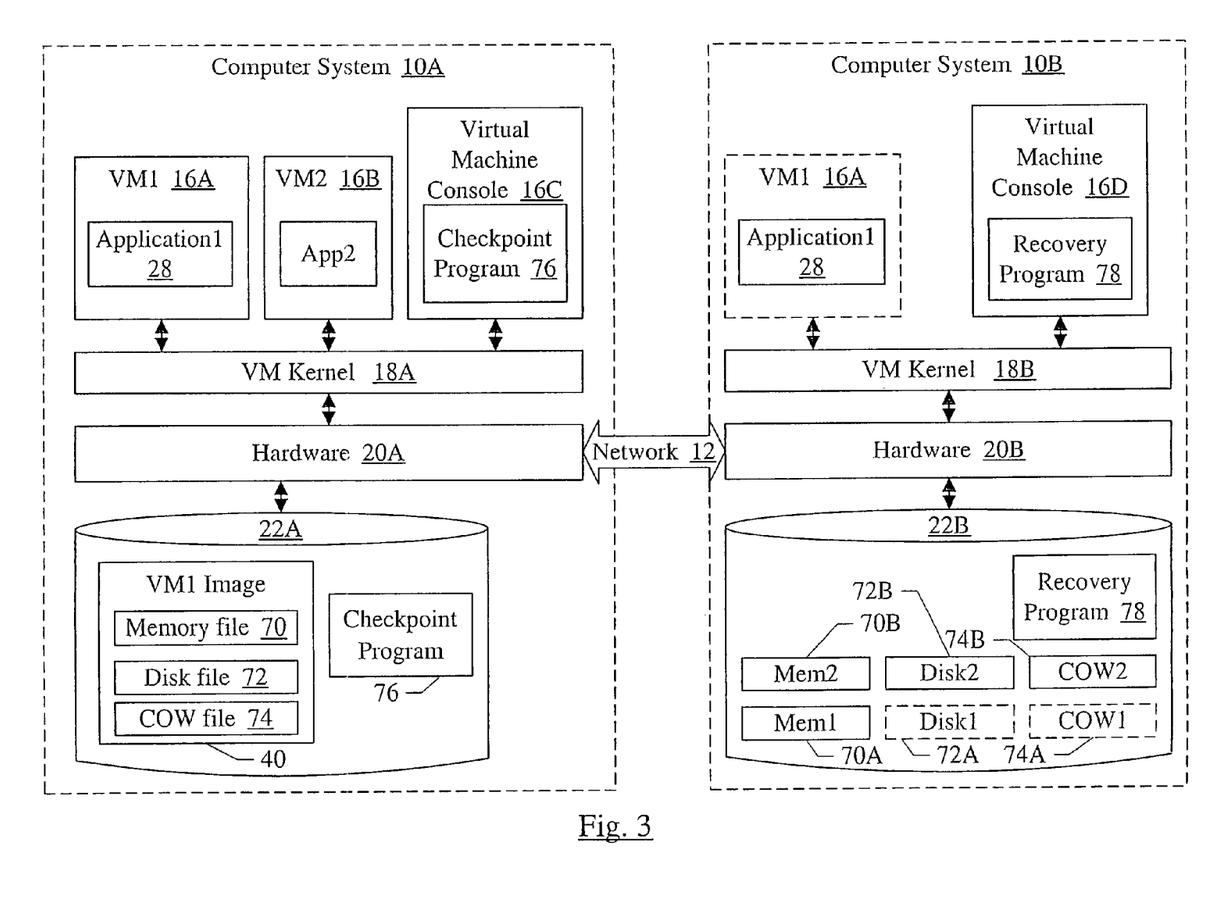
FIG. 3 is a block diagram of one embodiment of a pair of computer systems, wherein one of the computer systems is a disaster recovery site for the other computer system.

Turning next to FIG. 3, a block diagram illustrating a pair of computer systems 10A and 10B arranged in a disaster recover configuration is shown. Other embodiments are possible and contemplated. In the embodiment of FIG. 3, the computer system 10A may be the primary system (e.g. the one located at the user's site) and the computer system 10B may be the disaster recovery system (e.g. the one located physically remote from the user's site). The computer systems 10A and 10B may be coupled via a network 12. Similar to the computer system 10 shown in FIG. 1, the computer system 10A may include a VM kernel 18A, hardware 20A, and a storage device 22A. Similarly, the computer system 10B may include a VM kernel 18B, hardware 20B, and a storage device 22B. The computer system 10A is shown executing the virtual machines 16A-16C. Each virtual machine may include one or more applications, O/S, virtual storage, virtual CPU, virtual I/O, etc. (not shown in FIG. 3), similar to the illustration of the virtual machine 16A in FIG. 1. The computer system 10B is shown executing the virtual machine 16D (and may execute the virtual machine 16A, if a "disaster" event occurs with the computer system 10A).

The image 40 of the virtual machine 16A is illustrated in greater detail in FIG. 3 for one embodiment. In the illustrated embodiment, the image 40 includes a memory file 70, a disk file 72, and a COW file 74. The memory file 70 may include the state of the memory in the virtual machine 16A as well as any virtual hardware state that may be saved (e.g. the state of the virtual CPU 32, etc.). The disk file 72 may be the virtual disk file. A disk file 72 may be provided for each virtual disk in the virtual machine. The COW file 74 may be the COW file for a non-persistent virtual disk. A COW file 74 may be provided for each non-persistent virtual disk in the virtual machine.

A checkpoint program 76 may be executing in the virtual machine 16C (and may be stored on the storage device 22A as shown in FIG. 3). Similar to FIG. 1, the virtual machine 16C may be a console virtual machine. Alternatively, the checkpoint program 76 may execute on a non-console virtual machine or outside of a virtual machine. Generally, the checkpoint program 76 may periodically suspend the virtual machines which are to be replicated on the disaster recovery system, thus creating virtual machine images that may serve as checkpoints of the virtual machines on the disaster recovery system. The checkpoint program 76 copies the images to the computer system 10B over the network 12, and then resumes the virtual machines on the computer system 10A.

If a disaster event occurs (e.g. the computer system 10A crashes, is corrupted, or the environment the computer system 10A is executing in experiences a problem such as a loss of power, an act of God, etc.), the computer system 10B may recover the virtual machine or machines from any of the checkpoints that have been provided by the computer system 10A. For example, in FIG. 3, the recovery program 78 (executing in the virtual machine 16D and also stored on the storage device 22B) may be used to recover from one of the checkpoints. While the virtual machine 16D in which the recovery program 78 is executing is the console virtual machine, other embodiments may execute the recovery program 78 in a non-console virtual machine or outside of a virtual machine.

In FIG. 3, two checkpoints are shown stored on the storage device 22B (although in general any number of checkpoints may be stored). The first checkpoint includes the memory file 70A, the disk file 72A, and the COW file 74A. The second checkpoint (made later in time than the first checkpoint) includes the memory file 70B, the disk file 72B, and the COW file 74B. Either checkpoint may be used to recover the virtual machine 16A on the computer system 10B. To recover, the recovery program 78 resumes the virtual machine using one of the checkpoints. Thus, the virtual machine 16A is shown (in dashed lines) executing on the computer system 10B. The resumed virtual machine 16A would have the same state as the original virtual machine 16A on the computer system 10A at the time the checkpoint was made.

The virtual disk file 72A and the COW file 74A are shown in dotted lines in FIG. 3. These files may actually be deleted, in some embodiments, when the second checkpoint (comprising the memory file 70B, the virtual disk file 72B, and the COW file 74B) is written to the storage device 22B. In such embodiments, the virtual disk file 72B may be the same as the combination of the virtual disk file 72A and the COW file 74A. That is, in such embodiments, the checkpoint program 76 may commit the changes in the COW file 74 to the virtual disk file 72 after copying the image 40 to the computer system 10B, and may create a new COW file to collect updates which occur after the checkpoint is made. Thus, the virtual disk file 72B at the next checkpoint may be the combination of the preceding virtual disk file 72A and the preceding COW file 74A. In other embodiments, the virtual disk file 72A and the COW file 74A may be retained even after subsequent checkpoints are made.

The network 12 may comprise any network technology in various embodiments. The network 12 may be a local area network, wide area network, intranet network, Internet network, or any other type of network. The network 12 may be designed to be continuously available (although network outages may occur), or may be intermittent (e.g. a modem connection made between a computer system in a user's home and a computer system in a user's workplace). Any network protocol may be used. For example, the network 12 may be an Ethernet network. Alternatively, the network may be a token ring network, etc. The network 12 may also represent shared storage between the computer systems 10A-10B.

While FIG. 3 illustrates checkpointing the virtual machine 16A, other embodiments may also checkpoint the virtual machine 16B. In some embodiments, all virtual machines on a given computer system may be checkpointed. In other embodiments, a subset of the virtual machines (e.g. those executing so-called "mission critical" applications) may be checkpointed and other virtual machines executing less critical applications may not be checkpointed.

Figure 4:
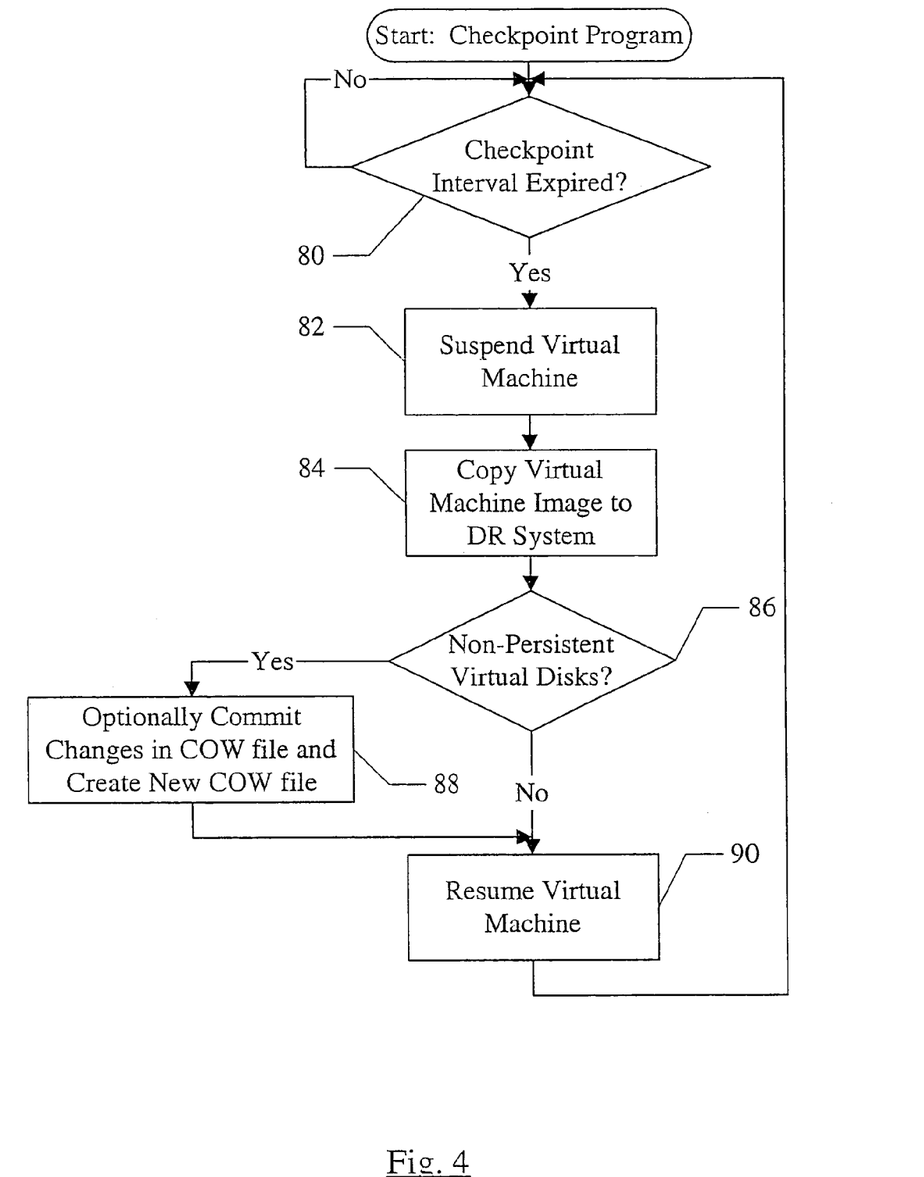
FIG. 4 is a flowchart illustrating operation of one embodiment of a checkpoint program shown in FIG. 3

Turning now to FIG. 4, a flowchart is shown illustrating operation of one embodiment of the checkpoint program 76. Other embodiments are possible and contemplated. The blocks shown in FIG. 4 may represent the operation of instructions forming the checkpoint program 76, when executed.

The checkpoint program 76 may wait for the checkpoint interval to expire (decision block 80). The operation of decision block 80 may represent the checkpoint program 76 being scheduled for execution (e.g. by the VM kernel 18A) at the expiration of the checkpoint interval, or may represent the checkpoint program 76 itself maintaining the interval. The checkpoint interval may be selected to be any desired interval between consecutive checkpoints. For example, a checkpoint interval of about 10 minutes may be used. A checkpoint interval in the range of, for example, 5 to 15 minutes may be used. Alternatively, the interval may be 30 minutes, one hour, or any other desired interval. The shorter the checkpoint interval, the more network bandwidth may be used to transfer the image 40 to the computer system 10B and the more frequently the applications executing in the virtual machines may be interrupted. The longer the checkpoint interval, the higher the risk of data loss may be (e.g. up to 10 minutes worth of data may be lost if the checkpoint interval is 10 minutes, while up to one hour worth of data may be lost if the checkpoint interval is one hour). The checkpoint interval may also be defined based on a quantity other than time. For example, the checkpoint interval may be based on the amount of activity occurring in a virtual machine. The number of file accesses, file writes, etc. could be counted to gauge the activity level, for instance. As another example, the return of an application to a certain point of execution may trigger a checkpoint. In yet another alternative, a checkpoint may be triggered when the COW files (in embodiments that make use of non-persistent virtual disks) exceed a threshold size. Any mechanism for causing checkpoints may be used, including combinations of the above.

If the checkpoint interval has expired, the checkpoint program 76 suspends the virtual machine to be checkpointed (block 82). The checkpoint program 76 copies the virtual machine image 40 to the disaster recovery (DR) computer system (e.g. the computer system 10B in the embodiment of FIG. 3) (block 84). If the virtual machine includes non-persistent virtual disks (decision block 86), the checkpoint program 86 may optionally commit the changes in the COW file 74 to the virtual disk file and establish a new COW file 74 to accumulate changes which occur after the checkpoint (block 88). Such a commit may be made, for example, for performance reasons (e.g. to improve the performance of the application executing on the computer system 10A). Alternatively, the updates may be committed prior to copying the virtual machine image 40 to the computer system 10B. Finally, the checkpoint program 76 resumes the virtual machine on the computer system 10A (block 90).

It is noted that, while FIG. 4 illustrated copying the virtual machine image 40 to the DR computer system, only a portion of the image 40 may be copied in other embodiments. For example, embodiments which employ non-persistent virtual disks may copy only the corresponding COW files if a copy of the disk files was previously transmitted to the DR computer system.

If multiple virtual machines are replicated to the disaster recovery computer system, the blocks 82-90 may be repeated for each virtual machine. Alternatively, all the virtual machines may be suspended, the images copied, the COW file updates optionally committed, and the virtual machines resumed.

Figure 5:
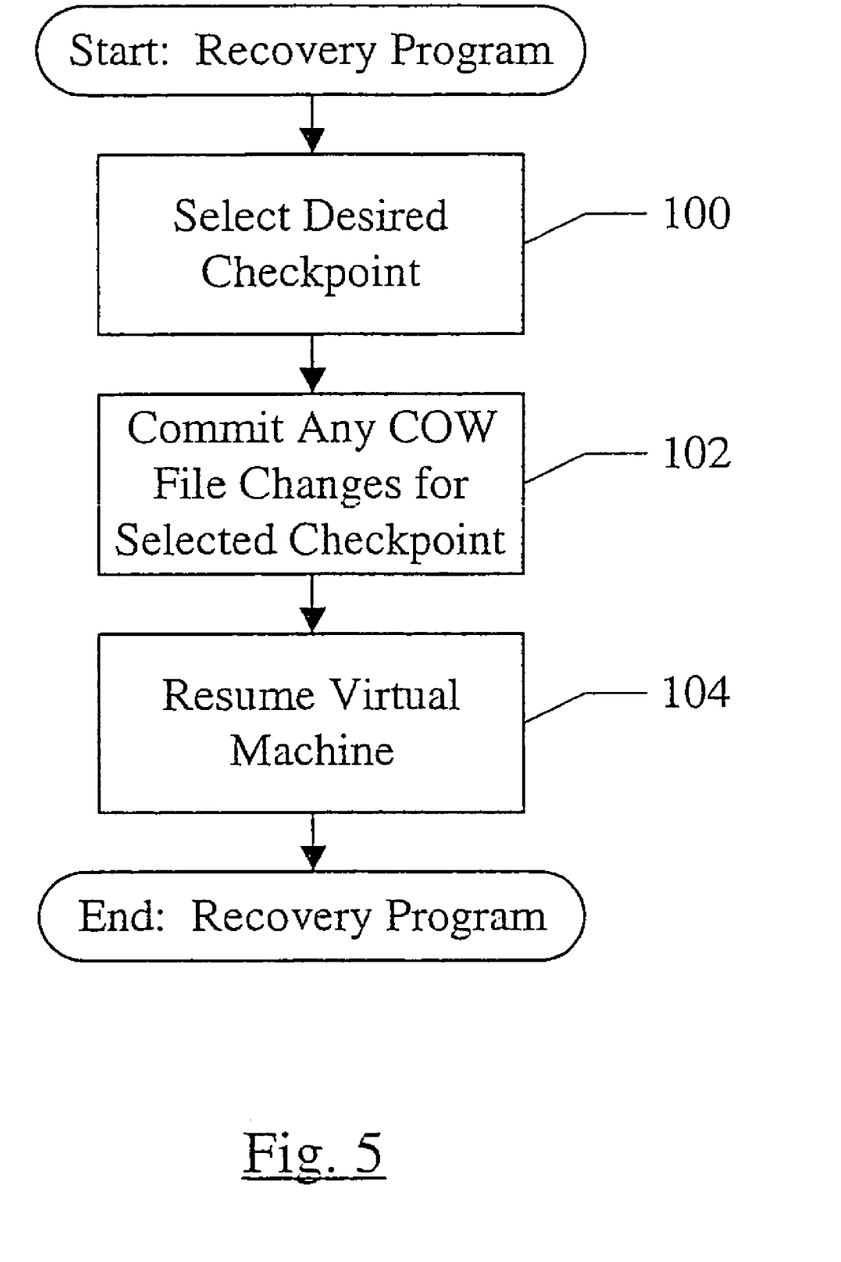
FIG. 5 is a flowchart illustrating operation of one embodiment of a recovery program shown in FIG. 3.

Turning next to FIG. 5, a flowchart is shown illustrating operation of one embodiment of the recovery program 78. Other embodiments are possible and contemplated. The blocks shown in FIG. 5 may represent the operation of instructions forming the checkpoint program 78, when executed.

The recovery program 78 may be activated if a disaster event occurs for the computer system 10A. The recovery program 78 may be manually activated, or may be activated by the computer system 10B in response to detecting that the computer system 10A has possibly experienced a disaster event. For example, the computer system 10A may attempt to signal the computer system 10B that a disaster event has occurred, or the computer system 10B may monitor the computer system 10A periodically and may assume a disaster event has occurred if contact cannot be established with the computer system 10A. The disaster event may be detected by a high-availability cluster server such as the Veritas Cluster Server™ available from Veritas Software Corporation (Mountain View, Calif.). The Veritas Cluster Server™ or other cluster server software may execute on the computer systems 10A-10B, which may be operating as a cluster.

The recovery program 78 may select the desired checkpoint (block 100). The desired checkpoint may be passed to the recovery program 78 as an operand, or may be selected by the recovery program 78. Typically, the desired checkpoint may be the most recent checkpoint, unless that checkpoint appears to be corrupted.

The recovery program 78 may commit any changes from the COW file(s) in the desired checkpoint to the corresponding virtual disk files in the desired checkpoint (block 102). The committing of the changes may be optional, in one embodiment. The recovery program 78 resumes the virtual machine (block 104).

It is noted that, while the embodiment of FIGS. 3-5 illustrates the computer system 10B being the disaster recovery system for the computer system 10A, in other embodiments the computer system 10A may also serve as the disaster recovery system for the computer system 10B. Additionally, multiple computer systems may be used as disaster recovery systems for the computer system 10A. In such an embodiment, the image 40 may be copied from the computer system 10A to each of the multiple computer systems. It is noted that, in one embodiment, a virtual machine may be dedicated to network address translation (NAT) services for handling network addresses such as TCP/IP addresses. In this manner, the addresses used by the other virtual machines may be the same on the disaster recovery system as on the original system, assuming that the NAT virtual machine is checkpointed and recovered as well.

Figure 6:
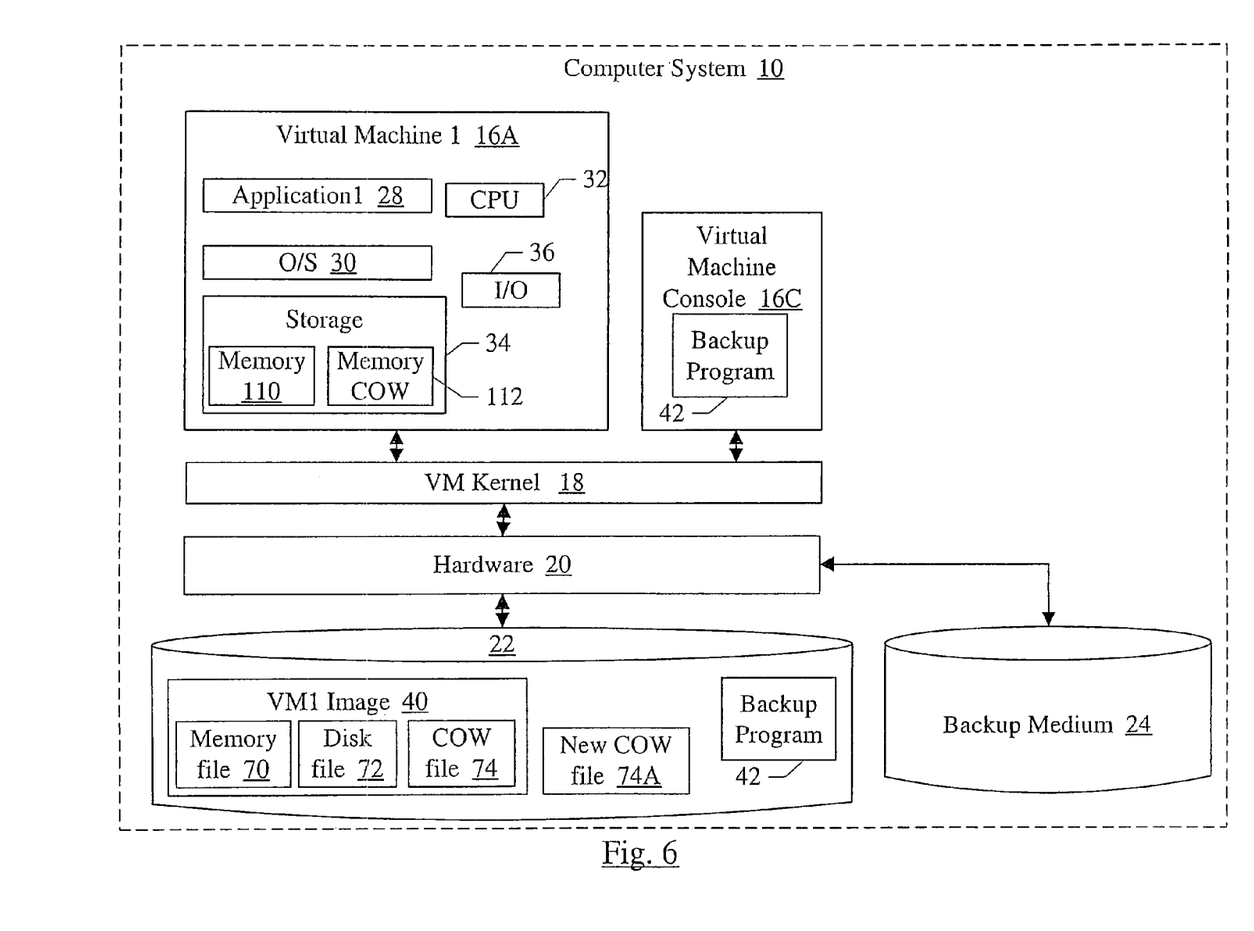
FIG. 6 is a block diagram of a second embodiment of a computer system.
Figure 7:
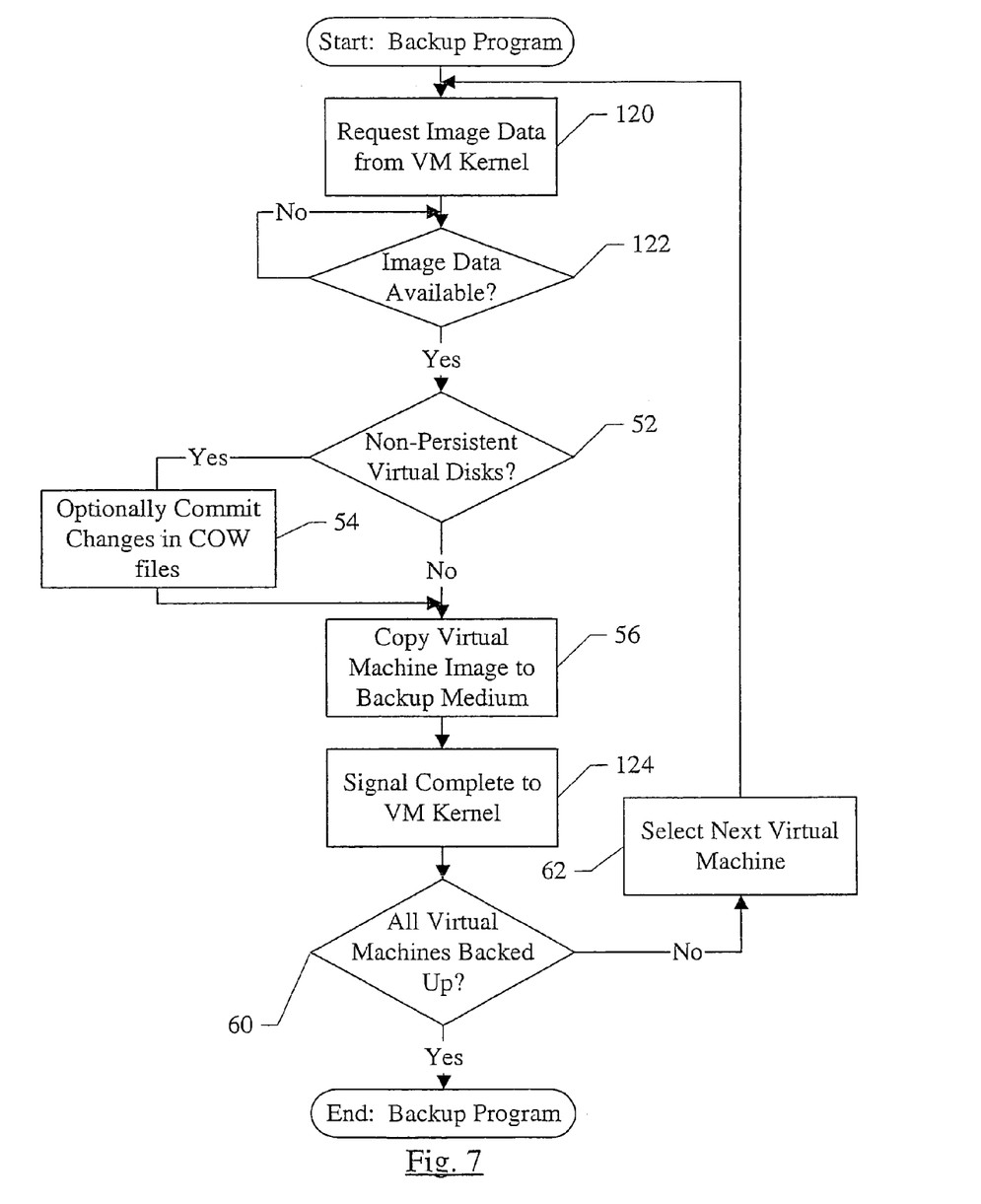
FIG. 7 is a flowchart illustrating operation of a second embodiment of a backup program shown in FIG. 6.
Figure 8:
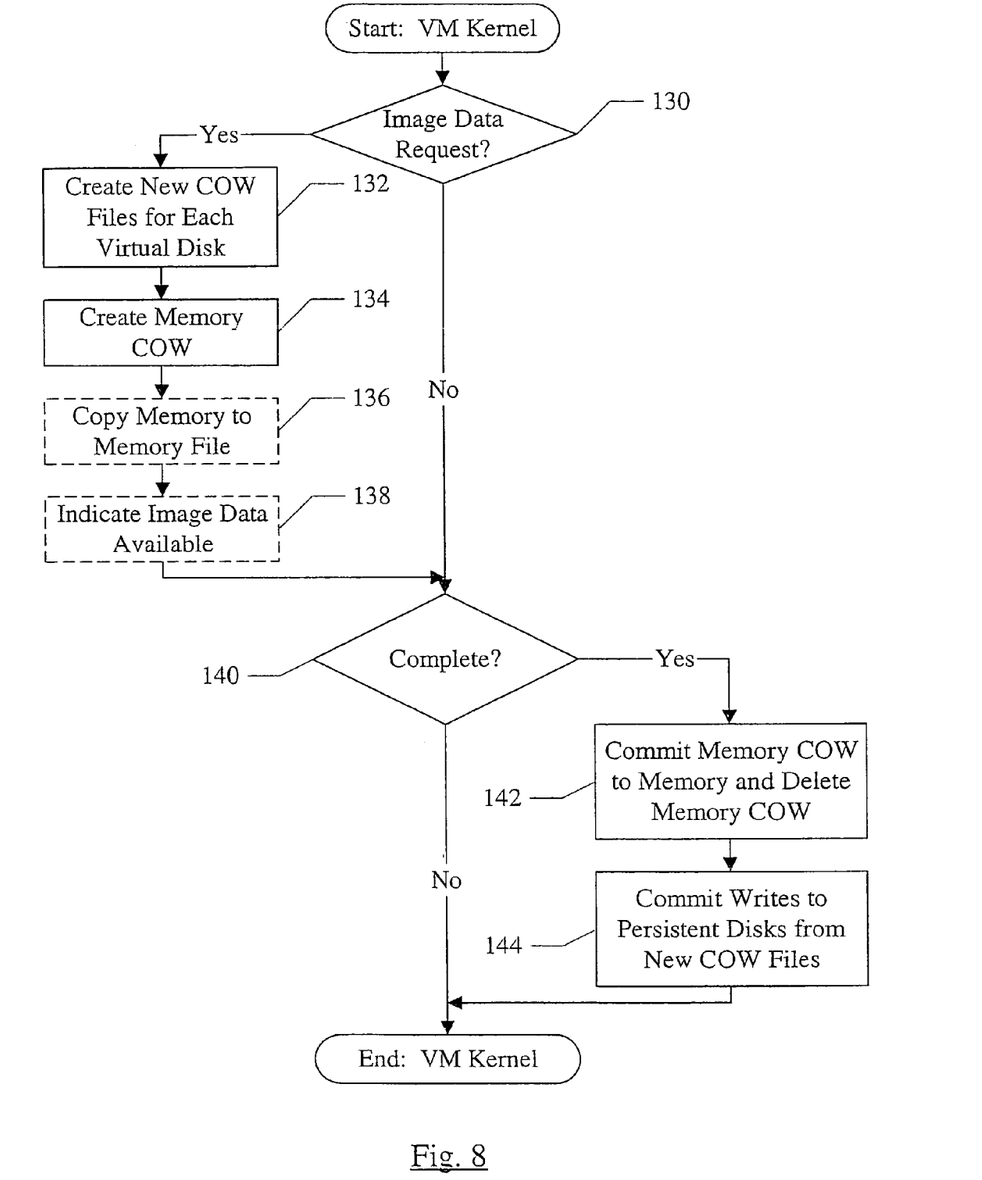
FIG. 8 is a flowchart illustrating operation of a portion of one embodiment of a VM kernel.

As mentioned previously, while some embodiments may suspend the virtual machines to make copies of the images (on a backup medium, or on another computer system in a disaster recovery configuration), other embodiments may cause the state of the virtual machines to be generated for copying without suspending the virtual machines. FIGS. 6-8 illustrate an embodiment for backing up virtual machines using such a mechanism. A disaster recovery embodiment is also contemplated, in which the state of the virtual machines is periodically generated and copied to the disaster recovery computer system.

FIG. 6 is a block diagram of a second embodiment of the computer system 10 shown in FIG. 1. In the embodiment of FIG. 6, the virtual storage 34 is illustrated as including a memory 110 and, during certain periods of time, a memory COW 112. Additionally, in this embodiment, the virtual machine image 40 is illustrated in more detail (similar to the embodiment of FIG. 3). The storage device 22 is also shown as storing a "new" COW file or files 74A. Other portions of the computer system shown in FIG. 6 may be similar to the corresponding portions shown in FIG. 1.

The memory 110 may be the portion of the computer system 110's main memory which is allocated to the virtual machine 16A for use as the memory of the virtual machine 16A. Thus, the memory 110 may store various data structures created by the application 28, files (or portions thereof) accessed by the application 28, and the application 28 itself (or portions thereof).

In the embodiment of FIG. 6, the backup program 42 (in cooperation with the VM kernel 18) may be configured to backup virtual machines without suspending the virtual machines. The backup program 42 may communicate an image data request to the VM kernel 18, indicating that the image data of a virtual machine (e.g. the virtual machine 16A in FIG. 6) is desired. That is, the image data request is a request for the current state of the virtual machine, as would be provided if the virtual machine were suspended, without actually suspending the virtual machine.

In response to the image data request, the VM kernel 18 may create the "new" COW file 74A for each virtual disk (whether persistent or non-persistent) in the virtual machine. The new COW file 74A may be used for subsequent updates to the corresponding virtual disk. In this manner, the state of the COW files 74 (which contain the updates prior to the image data request, back to at least the previous image data request or suspension of the virtual machine) and the virtual disk files 72 may remain constant even if the virtual machine 16A continues to execute, since subsequent updates are directed to the new COW files 74A. In other words, the COW files 74 and the virtual disk files 72 may be read-only by the virtual machine 16A after the new COW files 74A are created. Therefore, the COW files 74 and the virtual disk files 72 may be backed up by the backup program 42 without the files being changed during the backup.

Additionally, the VM kernel 18 may create the memory COW 112 to record subsequent updates to the memory 110 in response to the image data request. Therefore, the state of the memory 110 may remain constant even if the virtual machine 16A continues executing. The VM kernel 18 may copy the contents of the memory 110 to the memory file 70 (while allowing the virtual machine 16A to continue execution), thereby creating a copy of the memory 110 that may be backed up by the backup program 42. Alternatively, the backup program 42 may copy the contents of the memory 110, if the VM kernel 18 provides the addresses locating the memory 110 within the computer system 10 to the backup program 42.

The backup program 42 may copy the virtual machine image data thus generated, (i.e. not in response to a suspend of the virtual machine 16A but by collecting the state of the virtual machine 16A at a given point in time) while the virtual machine 16A is allowed to continue executing (using the new COW files 74A and the memory COW 112 for updates and reading the disk file 72, the COW file 74, and the memory 110 to obtain information which has not been updated since the image data was generated).

The backup program 42 may indicate to the VM kernel 18 that the backup is complete. In response, the VM kernel 18 may commit any changes recorded in the memory COW 112 to the memory 110 and delete the memory COW 112 (allowing subsequent updates to be performed to the memory 110). Additionally, any updates to persistent virtual disks that are recorded in the new COW files 74A may be committed to the persistent virtual disk files. The new COW files 74A may then be used as the COW file 74 for non-persistent virtual disks (or may be merged into the COW files 74, if the COW files 74 has not been committed to the corresponding non-persistent virtual disk).

The VM kernel 18 may use any mechanism to generate the memory COW 112. For example, in one embodiment, the VM kernel 18 may control the page tables used in the CPU's address translation mechanism. In response to the image data request, the VM kernel 18 may search the page tables and change the translations for the pages within the memory 110 to be read-only. Thus, any subsequent attempts to update a page within the memory 110 (e.g. by the application 28) may result in a page fault. In response to the page fault, the VM kernel 18 may map a page in the memory COW 112 to the page to be updated (and may make the newly-mapped page writeable). The VM kernel 18 may copy the contents of the page from the memory 110 to the page in the memory COW 112. The VM kernel 18 may then disable the translation for the page in the memory 110, and thus subsequent accesses may occur from the newly mapped page in the memory COW 112. To commit changes in the memory COW 112, each page in the memory COW 112 may be copied back to the corresponding page in the memory 110. The translation to each page in the memory COW 112 may be disabled, and the translations to the pages in the memory 110 may be enabled and may be set to read/write.

A checkpoint for the DR computer system (similar to the embodiment of FIGS. 3-5) may also be generated in a similar fashion. For example, the checkpoint program 76 may generate an image data request to the VM kernel 18 instead of the suspend command, may wait for the image data to be available, and may inform the VM kernel 18 when copying of the checkpoint to the DR computer system is complete.

Turning now to FIG. 7, a flowchart is shown illustrating operation of a second embodiment of the backup program 42 for use in the computer system 10 shown in FIG. 6. Other embodiments are possible and contemplated. The blocks shown in FIG. 7 may represent the operation of instructions forming the backup program 42, when executed.

In this embodiment, the backup program 42 may communicate the image data request to the VM kernel 18, indicating that the virtual machine image data is desired (block 120). The image data request may be a message passed from the backup program 42, for example. The message may include an identification of the virtual machine for which the state is to be provided. Any communication mechanism may be used to communicate the image data request (e.g. a memory location, a call to a procedure in the VM kernel 18, etc.). In response, as noted above and shown in FIG. 8 (described below), the VM kernel 18 may generate a virtual machine image 40 without suspending the virtual machine. The backup program 42 may wait until the image data (the virtual machine image 40) is available for the backup program 42 (decision block 122). The decision block 122 may represent the backup program 42 waiting for a message from the VM kernel 18. Alternatively, the decision block 122 may represent the backup program 42 terminating and being activated by the VM kernel 18 when the image data is available. In yet another alternative, a memory location may be used to communicate the availability of the state. Any mechanism for communicating to the backup program 42 that the image data is available may be used.

Similar to the embodiment of FIG. 2, the backup program 42 may optionally commit changes in the COW files 74

(within the image 40, not including the new COW file 74A) to the non-persistent virtual disks (blocks 52 and 54). The backup program 42 may copy the virtual machine image 40 (or a portion thereof, e.g. only the COW files for the non-persistent virtual disks, if a previous copy of the non-persistent virtual disks resides on the backup medium 24) (block 56).

The backup program 124 may signal the VM kernel 18 that the backup operation is complete (e.g. using another message to the VM kernel 18 or any other communication mechanism) (block 124). The backup program 42 may continue to backup other virtual machines, as desired (decision block 60 and block 62), similar to the embodiment of FIG. 2.

Turning now to FIG. 8, a flowchart illustrating operation of one embodiment of a portion of the VM kernel 18 is shown. The portion shown in FIG. 8 is for interacting with the backup program 42. Other portions, not shown, may perform other operations implemented by the VM kernel 18. Other embodiments are possible and contemplated. The blocks shown in FIG. 8 may represent the operation of instructions forming the VM kernel 18, when executed.

In response to the image data request from the backup program 42 (decision block 130), the VM kernel 18 may capture the current state of a virtual machine. More particularly, the VM kernel 18 may create new COW files 74A for each virtual disk (including both persistent and non-persistent virtual disks) (block 132). Additionally, the VM kernel 18 may create the memory COW 112 (block 134). After the new COW files 74A and the memory COW 112 have been created, the memory 110, the disk files 72, and the COW files 74 comprise a static state of the virtual machine. At this point, the VM kernel 18 may allow the virtual machine for which state is being captured to continue executing, if desired.

The VM kernel 18 may copy the memory 110 to the memory file 70, to complete the image data (block 136). Subsequent to copying the memory 110 to the memory file 70, the VM kernel 18 may indicate to the backup program 42 that the image data is available (block 138). Blocks 136 and 138 are shown in dotted form to indicate that they may be performed as the corresponding virtual machine continues operation.

In response to receiving a complete indication from the backup program 42 (decision block 140), the VM kernel 18 commits the changes recorded in the memory COW 112 (block 142) and deletes the memory COW 112. Subsequent memory updates may be performed to the memory 110. Additionally, the VM kernel 18 commits writes to persistent disks which are recorded in the new COW files 74A (block 144). The remaining writes may be retained in the new COW file 74A, which may become the COW files in the image 40 (or may be merged into the COW files 74, if the COW files 74 were not committed to the corresponding non-persistent virtual disks).

Various operations have been assigned to the backup program 42, the checkpoint program 76 and the recovery program 78, in the above description. However, in other embodiments, various ones of these operations may be performed manually by a user. Furthermore, the backup program 42, the checkpoint program 76, and/or the recovery program 78 (or portions thereof) may be implemented as part of the VM kernel, in some embodiments. Specifically, some embodiments of the VM kernel may support the checkpointing of virtual machines. Thus, the checkpoint program 76 may copy the checkpoints to the disaster recovery system in such an embodiment.

It is noted that, in various embodiments shown above, the backup program 42, the checkpoint program 76, the recovery program 78, and/or the image 40 of the virtual machine 16A are shown stored on various storage devices. Generally, any one or more of the above (and/or the VM kernel 18A, the O/S 30, the application 28, etc.) may be carried on a carrier medium. Generally speaking, a carrier medium may include storage media such as magnetic or optical media, e.g., disk or CD-ROM, volatile or non-volatile memory media such as RAM (e.g. SDRAM, RDRAM, SRAM, etc.), ROM, etc. Any of the previous media and/or any other physical media readable by a computer may comprise computer readable media. A carrier medium may further comprise transmission media or signals such as electrical, electromagnetic, or digital signals, conveyed via a communication medium such as a network and/or a wireless link.

Numerous variations and modifications will become apparent to those skilled in the art once the above disclosure is fully appreciated. It is intended that the following claims be interpreted to embrace all such variations and modifications.

What is claimed is:

1. A method comprising:
   receiving a request in a first computer system for an image of a virtual machine during execution of the virtual machine on the first computer system, wherein the virtual machine comprises at least one application, an operating system on which the application is designed to execute, memory data to which the application and operating system have access, and one or more virtual disks including one or more files accessed by the application or operating system;
   creating an image of the virtual machine in response to the request and without suspending the virtual machine, wherein the image comprises at least the one or more files on the one or more virtual disks and the memory data; and
   tracking which memory locations within a memory of the virtual machine are modified by the application or operating system during the creation of the image, wherein the modifications are tracked separate from the memory data included in the image.

2. The method as recited in claim 1 further comprising, subsequent to creating the image, copying the modifications that were tracked during the creation of the image to the memory.

3. The method as recited in claim 1 further comprising tracking modifications to the one or more files separate from the image.

4. The method as recited in claim 3 further comprising copying the modifications to the one or more files into the files subsequent to creating the image.

5. The method as recited in claim 1 further comprising transmitting the image to a storage device that is separate from another storage device to which the virtual machine is suspendable.

6. A computer system comprising:
   execution hardware configured to execute instructions;
   a virtual machine comprising at least one application, an operating system on which the application is designed to execute, memory data to which the application and operating system have access, and one or more virtual disks including one or more files accessed by the application or operating system; and
   one or more modules configured to manage execution of the virtual machine and configured to receive a request for an image of the virtual machine during execution of the virtual machine, and wherein the one or more modules are configured to create an image of the virtual machine in response to the request and without suspending the virtual machine, wherein the image comprises at least the one or more files on the one or more virtual disks and the memory data, and wherein the one or more modules are configured to track which memory locations with a memory of the virtual machine are modified by the application or operating system during the creation of the image, wherein the modifications are tracked separate from the memory data included in the image.

7. The computer system as recited in claim 6 wherein the one or more modules are configured to copy the modifications that were tracked during the creation of the image to the memory subsequent to creating the image.

8. The computer system as recited in claim 6 wherein the one or more modules are configured to track modifications to the one or more files separate from the image.

9. The computer system as recited in claim 8 wherein the one or more modules are configured to copy the modifications to the one or more files into the files subsequent to creating the image.

10. The computer system as recited in claim 6 wherein the one or more modules are configured to transmit the image to a storage device that is separate from another storage device to which the virtual machine is suspendable.

11. A computer readable medium storing a plurality of instructions which, when executed:
    receive a request in a first computer system for an image of a virtual machine during execution of the virtual machine on the first computer system, wherein the virtual machine comprises at least one application, an operating system on which the application is designed to execute, memory data to which the application and operating system have access, and one or more virtual disks including one or more files accessed by the application or operating system;
    create an image of the virtual machine in response to the request and without suspending the virtual machine, wherein the image comprises at least the one or more files on the one or more virtual disks and the memory data; and
    track which memory locations within a memory of the virtual machine are modified by the application or operating system during the creation of the image, wherein the modifications are tracked separate from the memory data included in the image.

12. The computer readable medium as recited in claim 11 wherein the plurality of instructions, when executed subsequent to creating the image, copy the modifications that were tracked during the creation of the image to the memory.

13. The computer readable medium as recited in claim 11 wherein the plurality of instructions, when executed, track modifications to the one or more files separate from the image.

14. The computer readable medium as recited in claim 13 wherein the plurality of instructions, when executed, copy the modifications to the one or more files into the files subsequent to creating the image.

15. The computer readable medium as recited in claim 11 wherein the plurality of instructions, when executed, transmit the image to a storage device that is separate from another storage device to which the virtual machine is suspendable.

16. A method comprising:
    creating an image of a virtual machine, wherein the virtual machine comprises at least one application, an operating system on which the application is designed to execute, memory data to which the application and operating system have access, and one or more virtual disks including one or more files accessed by the application or operating system, and wherein the image comprises at least the one or more files on the one or more virtual disks and the memory data; and
    transmitting the image to a storage device separate from another storage device to which the virtual machine is suspendible.

17. The method as recited in claim 16 wherein creating the image is performed without suspending the virtual machine.

18. The method as recited in claim 16 further comprising:
    suspending the virtual machine prior to creating the image; and
    resuming the virtual machine subsequent to creating the image.

* * * * *